(12) United States Patent
Lederer et al.

(10) Patent No.: US 8,721,946 B2
(45) Date of Patent: May 13, 2014

(54) LOW-STICKY ADDITIVE PACKAGE FOR AUTOMOTIVE INTERIOR APPLICATIONS

(75) Inventors: Klaus Lederer, Linz (AT); Erwin Kastner, Linz (AT)

(73) Assignee: Borealis AG, Vienna (AT)

( * ) Notice: Subject to any disclaimer, the term of this patent is extended or adjusted under 35 U.S.C. 154(b) by 255 days.

(21) Appl. No.: 12/735,460

(22) PCT Filed: Jan. 19, 2009

(86) PCT No.: PCT/EP2009/050555
§ 371 (c)(1),
(2), (4) Date: Jul. 19, 2010

(87) PCT Pub. No.: WO2009/092691
PCT Pub. Date: Jul. 30, 2009

(65) Prior Publication Data
US 2010/0286310 A1    Nov. 11, 2010

(30) Foreign Application Priority Data

Jan. 25, 2008  (EP) .................................... 08150670
Jul. 29, 2008  (EP) .................................... 08161364

(51) Int. Cl.
*C08K 5/1515*  (2006.01)
*B29C 47/00*  (2006.01)
*C08L 23/12*  (2006.01)

(52) U.S. Cl.
USPC .......... 264/211; 264/176.1; 525/107; 525/529

(58) Field of Classification Search
USPC ..................... 525/107, 529; 264/176.1, 211
See application file for complete search history.

(56) References Cited

U.S. PATENT DOCUMENTS 5,585,420 A *  12/1996  Grasmeder et al. ........... 523/400
5,731,376 A      3/1998  Grasmeder
2001/0044518 A1* 11/2001  Hoffmann et al. ............. 528/108
2006/0276571 A1* 12/2006  Sharma et al. .................. 524/98

FOREIGN PATENT DOCUMENTS

EP         0 426 315 A      5/1991
WO      WO 93/03095 A      2/1993
WO      WO 94/18267 A      8/1994
WO      WO 2006/003127 A   1/2006

OTHER PUBLICATIONS

Registry data of CAS No. 106990-43-6, provided by STN (no date).*
Registry data of CAS No. 106990-43-6, provided by www.chemicalbook.com (no date).*
"Discover Our World of Effects for Polyolefins", provided by Ciba Specialty Chemicals (2004).*
Registry data of CAS No. 52829-07-9, provided by STN (no date).*
Technical Information for Tinuvin 770, provided by BASF (2010).*
Technical Information for Irganox 1010, provided by Ciba Specialty Chemicals (1998).*
Technical Information for Chimassorb 944, provided by Ciba Specialty Chemicals (2002).*
Registry data of CAS No. 112-84-5, provided by STN (no date).*
Registry data of CAS No. 25036-25-3, provided by STN (no date).*
Product Data Sheet for Araldite GT6750, provided by JANA (2009).*
Koch et al.; Evaluation of Scratch Resistance in Multiphase PP Blends; Science Direct, Polymer Testing; www.sciencedirect.com; 2007; pp. 927-936; Elsevier Ltd.
The Dow Chemical Company. D.E.R. 6116 Solid Epoxy Resin [online], [retrieved on Dec. 10, 2013]. Retrieved from the Internet <URL: http://www.dow/com/assets/attachments/business/pcm/der/derr_6116/tds/der_6116.pdf>.
Jana. Araldite GY 250 Product Data Sheet, Unmodified, medium viscosity liquid Epoxy Resin [online], [retrieved on Jun. 2005 ] . Retrieved from the Internet <<URL::http://www.jana-ksa.net/products/pdf/araldite/GY250.pdc.>

* cited by examiner

*Primary Examiner* — Michael J Feely
(74) *Attorney, Agent, or Firm* — Warn Partners, P.C.

(57) ABSTRACT

Composition comprising polypropylene and (a) at least one phenolic antioxidant (A) (b) at least one hindered amine light stabilizer (B) (c) at least one slip agent (C) being a fatty acid amide, (d) a bisphenol A epoxy resin with an average molecular weight (Mw) below 2000 g/mol (D), and (e) talc (E).

28 Claims, No Drawings

LOW-STICKY ADDITIVE PACKAGE FOR AUTOMOTIVE INTERIOR APPLICATIONS

This application is a National Stage of International Application No. PCT/EP2009/050555, filed Jan. 19, 2009. This application claims priority to European Patent Application No. 08150670.1 filed on Jan. 25, 2008 and European Patent Application No. 08161364.8 filed on Jul. 29, 2008. The disclosures of the above applications are incorporated herein by reference.

The present invention relates to a new (extruded) polypropylene composition suitable for automotive interior as well as to its use.

Polypropylene is the material of choice for articles in the automotive interior as it is—general speaking—resistant against many environmental influences. However such material used in automotive interior must fulfil in particular UV-stability, long term heat resistance as well as scratch resistance which cannot be achieved by the pure polymer material itself, like polypropylene. To satisfy such requirements the polymer used must therefore blended with different additives. Over the last years the standard requirements for UV-stability, long term heat resistance and scratch resistance have been steadily tighten. As a consequence thereof the amounts of additives have been increased to satisfy the ambitioned desires of the automotive industry. However with increase of additives to improve for instance the scratch resistance or the long term heat resistance other important properties are negatively influenced. For instance with the incorporation of the above mentioned additives the material shows undesired stickiness, especially after storage at elevated temperatures and/or after UV-exposure.

Accordingly the object of the present invention is to provide an (extruded) composition which does not show any stickiness problems, in particular when stored for 90 hours and 500 hours respectively, at elevated temperatures, like 90° C., and/or under UV-exposure. Of course the other desired properties for materials used in the automotive interior, like UV-stability, long term heat resistance as well as scratch resistance must be kept on a high level.

The finding of the present invention is to provide an (extruded) polypropylene composition in which a certain amount of phenolic antioxidants and UV-stabilizers are replaced by a bisphenol A epoxy resin.

Thus the present invention is directed to a composition, preferably an extruded composition, comprising polypropylene and (a) at least one phenolic antioxidant (A)
(b) at least one hindered amine light stabilizer (B)
(c) at least one slip agent (C) being a fatty acid amide,
(d) a bisphenol A epoxy resin with an average molecular weight ($M_w$) below 2000 g/mol (D),
(e) talc (E), and
(f) optionally at least one phosphorous antioxidant (F)

The term "extruded composition" or the term "extruded polypropylene composition" throughout the present application shall indicate that the composition is not a dry blend of polypropylene and its additives but that the polypropylene and the additives after dry blending are extruded by an extruder and optionally pelletized.

Preferably the composition, more preferably the extruded composition, as defined in the instant invention does not comprise, i.e. is free of, polyorganosiloxane. Additionally it is appreciated that the composition, preferably the extruded composition, according to the instant invention does not comprise, i.e. is free of, distearylthiodipropionate and/or zinc stearate.

Alternatively and preferably the invention is directed to a composition, preferably an extruded composition, comprising polypropylene, talc (E), preferably 50000 to 400000 ppm talc (E), and (a) 400 to 2400 ppm of phenolic antioxidant(s) (A)
(b) 1000 to 2500 ppm of hindered amine light stabilizer(s) (B)
(c) 1000 to 2000 ppm of slip agent(s) (C) being a fatty acid amide(s),
(d) 2000 to 3000 ppm of a bisphenol A epoxy resin with an average molecular weight ($M_w$) below 2000 g/mol (D), and
(e) optionally 500 to 1500 ppm of phosphorous antioxidant(s) (F) based on said (extruded) composition, wherein optionally said (extruded) composition does not comprise, i.e. is free of, at least one member of the group consisting of polyorganosiloxane distearylthiodipropionate and zinc stearate.

It is in particular appreciated that the composition, preferably the extruded composition, as defined in the previous paragraph does not comprise, i.e. is free of, polyorganosiloxane. Yet more preferably the composition, preferably the extruded composition, as defined in the previous paragraph does not comprise, i.e. is free of, polyorganosiloxane, distearylthiodipropionate and zinc stearate. It is especially appreciated that the composition, preferably the extruded composition, as defined herein consists of the polypropylene and the additives (A) to (F) as defined in the instant invention.

As usual 1 ppm of additive corresponds to 1 mg additive in 1 kg (extruded) composition.

Surprisingly it has been found out that the above defined (extruded) compositions do not show any stickiness problems even when stored for 90 to 500 hours at elevated temperatures (90° C.) and/or under UV-exposure (see table 4). Contrarily, additive packages known in the art based on polypropylene and comprising the standard mixtures of UV-stabilizers, antioxidants and slip agents clearly show the detrimental stickiness behaviour in particular when stored for 90 to 500 hours at elevated temperatures (90° C.) and/or under UV-exposure. Additionally the inventive (extruded) composition shows excellent UV-stability, long term heat resistance as well as excellent scratch resistance. Thus the improvement of the stickiness behaviour is not paid with loss of the other important properties required by the automotive industry.

In the following both alternatives as defined above are described in more detail.

The first requirement is that the polypropylene composition, preferably the extruded polypropylene composition, must comprise at least one phenolic antioxidant (A). However it is preferred that the inventive polypropylene composition, preferably the inventive extruded polypropylene composition, comprises only one phenolic antioxidant (A).

The term "phenolic antioxidant" as used in the instant invention stands for any compound capable of slowing or preventing the oxidation of the polymer component, i.e. the polypropylene. Additionally such a phenolic antioxidant must of course comprise a phenolic residue.

Better results can be achieved in case the phenolic antioxidant(s) (A) is(are) sterically hindered. "Sterically hindered" according to this invention means that the hydroxyl group (HO—) of the phenolic residue is surrounded by sterical alkyl residues.

Accordingly the phenolic antioxidant(s) (A) comprise(s) preferably the residue of formula (I)

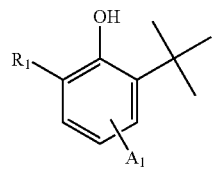
(I)

wherein $R_1$ is $(CH_3)_3C—$, $CH_3—$ or H, preferably $(CH_3)_3C—$, and $A_1$ constitutes the remaining part of the phenolic antioxidant (A).

Preferably $A_1$ is in para-position to the hydroxyl-group.

Additionally the phenolic antioxidant shall preferably exceed a specific molecular weight. Accordingly the phenolic antioxidant(s) (A) has(have) preferably a molecular weight ($M_w$) of more than 785 g/mol, more preferably more than 1100 g/mol. On the other hand the molecular weight should be not too high, i.e. not higher than 1300 g/mol. A preferred range is from 785 to 1300 g/mol, more preferably from 1000 to 1300 g/mol, yet more preferably from 1100 to 1300 g/mol.

Further the phenolic antioxidant(s) (A) can be additionally defined by the amount of phenolic residues, in particular by the amount of phenolic residues of formula (I). Accordingly the phenolic antioxidant(s) (A) may comprise(s) 1, 2, 4 or more phenolic residue(s), preferably 1, 2, 4 or more phenolic residue(s) of formula (I).

Moreover the antioxidant(s) (A) comprise mainly only carbon atoms, hydrogen atoms and minor amounts of O-atoms, mainly caused due to the hydroxyl group (HO—) of the phenolic residue. However the antioxidant(s) (A) may comprise additionally minor amounts of N, S and P atoms. Preferably the antioxidant(s) (A) is(are) constituted by C, H, O, N and S atoms only, more preferably the antioxidant(s) (A) is(are) constituted by C, H and O only.

As stated above the phenolic antioxidant(s) (A) shall have a rather high molecular weight. A high molecular weight is an indicator for several phenolic residues. Thus it is in particular appreciated that the phenolic antioxidant(s) (A) has(have) 4 or more, especially 4, phenolic residue(s), like the phenolic residue of formula (I).

As especially suitable phenolic antioxidant(s) (A) have been recognized compounds comprising at least one residue of formula (II)

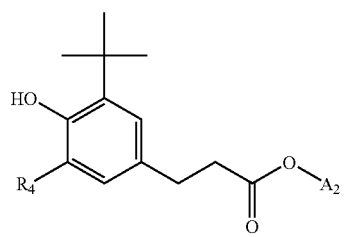
(II)

wherein $R_4$ is $(CH_3)_3C—$, $CH_3—$, or H, preferably $(CH_3)_3C—$, and $A_2$ constitutes the remaining part of the phenolic antioxidant (A).

It has been found out that the stickiness problems are mainly caused by the phenolic antioxidants as well as to some extent by the amine hindered UV-stabilizers, in particular low molecular weight amine hindered UV-stabilizers. This finding is somewhat surprising as there exits a prejudice in the literature that the slip agents (C) are the main causer for the stickiness problems. Slip agents normally migrate continuously from the interior of the polymer material to its surface and guarantee thereby a permanent scratch resistance. Accordingly the slip agents have been regarded as the main causer of the stickiness problems. Now it has been discovered that also the special phenolic antioxidants and to some extent also specific UV-stabilizers influence significantly the stickiness behaviour of the polymer material.

Accordingly to avoid any stickiness problems, in particular at elevated temperatures and/or UV-exposure, it is preferred that the phenolic antioxidant(s) (A) does(do) not comprise the moiety of formula (III)

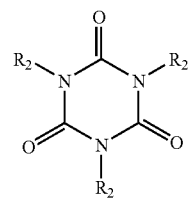

wherein $R_2$ is selected from the group consisting of $—CH_2—R_{31}$, $—CH_2—CH_2—R_{32}$, $—CH_2—CH_2—CH_2—R_{33}$ and $—CH_2—CH_2—CH_2—CH_2—R_{34}$, preferably $R_2$ is $—CH_2—R_{31}$, and $R_{31}$, $R_{32}$, $R_{33}$ and $R_{34}$ can be independently any organic residue with the proviso that at least one of the $R_{31}$, $R_{32}$, $R_{33}$ and $R_{34}$ is a phenolic residue, preferably a phenolic residue of formula (I).

As stated above some phenolic antioxidants (A) should be avoided as they contribute to the stickiness phenomena at elevated temperatures. Thus the inventive polypropylene composition, preferably the inventive extruded polypropylene composition, is preferably free of phenolic antioxidants (A) which comprise the moiety of formula (IV)

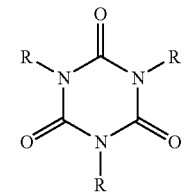

wherein R is any residue which may comprise a phenolic moiety.

Especially the phenolic antioxidant (A) of formula (V)

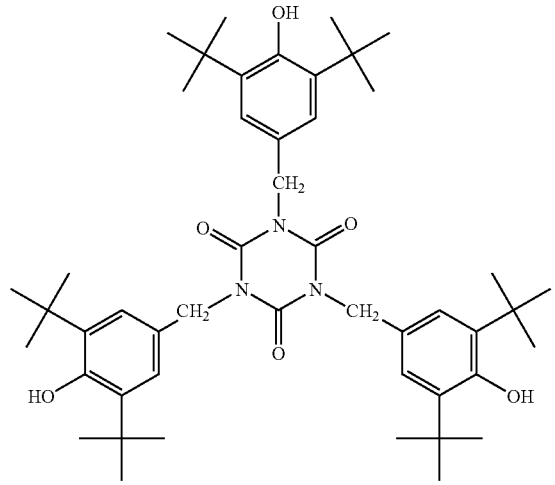 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

shall be not part of the inventive (extruded) polypropylene composition.

Considering the above requirements the phenolic antioxidant(s) (A) is(are) selected from the group consisting of
2,6-di-tert-butyl-4-methylphenol (CAS no. 128-37-0; 220 g/mol),
pentaerythrityl-tetrakis(3-(3,5-di-tert-butyl-4-hydroxyphenyl)propionate (CAS no. 6683-19-8; 1178 g/mol),
octadecyl 3-(3',5'-di-tert-butyl-4-hydroxyphenyl)propionate (CAS no. 2082-79-3; 531 g/mol)
1,3,5-trimethyl-2,4,6-tris-(3,5-di-tert-butyl-4-hydroxybenzyl)benzene (CAS no. 1709-70-2; 775 g/mol),
2,2'-thiodiethylenebis(3,5-di-tert.-butyl-4-hydroxyphenyl)propionate (CAS no. 41484-35-9; 643 g/mol),
calcium bis(ethyl 3,5-di-tert-butyl-4-hydroxybenzylphosphonate) (CAS no. 65140-91-2; 695 g/mol),
bis(3,3-bis(3'-tert-butyl-4'-hydroxyphenyl)butanic acid)glycolester (CAS no. 32509-66-3; 794 g/mol),
4,4'-thiobis(2-tert-butyl-5-methylphenol) (CAS no. 96-69-5; 358 g/mol),
2,2'-methylene-bis-(6-(1-methyl-cyclohexyl)-para-cresol) (CAS no. 77-62-3; 637 g/mol),
3,3'-bis(3,5-di-tert-butyl-4-hydroxyphenyl)-N,N'-hexamethylenedipropionamide (CAS no. 23128-74-7; 637 g/mol),
2,5,7,8-tetramethyl-2-(4',8',12'-trimethyltridecyl)-chroman-6-ol (CAS no. 10191-41-0; 431 g/mol), 2,2-ethylidenebis (4,6-di-tert-butylphenol) (CAS no. 35958-30-6; 439 g/mol),
1,1,3-tris(2-methyl-4-hydroxy-5'-tert-butylphenyl)butane (CAS no. 1843-03-4; 545 g/mol),
3,9-bis(1,1-dimethyl-2-(beta-(3-tert-butyl-4-hydroxy-5-methylphenyl)propionyloxy)ethyl)-2,4,8,10-tetraoxaspiro[5.5]undecane (CAS no. 90498-90-1; 741 g/mol),
1,6-hexanediyl-bis(3,5-bis(1,1dimethylethyl)-4-hydroxybenzene)propanoate) (CAS no. 35074-77-2; 639 g/mol),
2,6-di-tert-butyl-4-nonylphenol (CAS no. 4306-88-1; 280 g/mol),
4,4'-butylidenebis(6-tert-butyl-3-methylphenol (CAS no. 85-60-9; 383 g/mol);
2,2'-methylene bis(6-tert-butyl-4-methylphenol) (CAS no. 119-47-1; 341 g/mol), triethylenglycol-bis-(3-tert-butyl-4-hydroxy-5-methylphenyl)propionate (CAS no. 36443-68-2; 587 g/mol),
a mixture of C13 to C15 linear and branched alkyl esters of 3-(3',5'-di-t-butyl-4'-hydroxyphenyl)propionic acid (CAS no. 171090-93-0; 485 g/mol),
6,6'-di-tert-butyl-2,2'-thiodip-cresol (CAS no. 90-66-4; 359 g/mol),
diethyl-(3,5-di-tert-butyl-4-hydroxybenzyl)phosphate (CAS no. 976-56-7; 356 g/mol),
4,6-bis(octylthiomethyl)-o-cresol (CAS no. 110553-27-0; 425 g/mol),
benzenepropanoic acid, 3,5-bis(1,1-dimethyl-ethyl)-4-hydroxy-, C7-C9-branched and linear alkyl esters (CAS no. 125643-61-0; 399 g/mol),
1,1,3-tris[2-methyl-4-[3-(3,5-di-tert-butyl-4-hydroxyphenyl)propionyloxy]-5-tert-butylphenyl]butane (CAS no. 180002-86-2; M, 1326 g/mol),
mixed styrenated phenols ($K_w$ ca 320 g/mol; CAS no. 61788-44-1; ca. 320 g/mol),
butylated, octylated phenols ($K_w$ ca 340 g/mol; CAS no. 68610-06-0; ca 340 g/mol), and
butylated reaction product of p-cresol and dicyclopentadiene (CAS no. 68610-51-5; $M_w$ 700 to 800 g/mol).

More preferably the phenolic antioxidant(s) (A) is(are) selected from the group consisting of
pentaerythrityl-tetrakis(3-(3,5-di-tert-butyl-4-hydroxyphenyl)propionate (CAS no. 6683-19-8; 1178 g/mol),
octadecyl 3-(3',5'-di-tert-butyl-4-hydroxyphenyl)propionate (CAS no. 2082-79-3; 531 g/mol)
bis(3,3-bis(3'-tert-butyl-4'-hydroxyphenyl)butanic acid)glycolester (CAS no. 32509-66-3; 794 g/mol),
3,3'-bis(3,5-di-tert-butyl-4-hydroxyphenyl)-N,N'-hexamethylenedipropionamide (CAS no. 23128-74-7; 637 g/mol),
3,9-bis(1,1-dimethyl-2-(beta-(3-tert-butyl-4-hydroxy-5-methylphenyl)propionyloxy)ethyl)-2,4,8,10-tetraoxaspiro[5.5]undecane (CAS no. 90498-90-1; 741 g/mol),
1,6-hexanediyl-bis(3,5-bis(1,1dimethylethyl)-4-hydroxybenzene)propanoate) (CAS no. 35074-77-2; 639 g/mol),
triethylenglycol-bis-(3-tert-butyl-4-hydroxy-5-methylphenyl)propionate (CAS no. 36443-68-2; 587 g/mol),
a mixture of C13 to C15 linear and branched alkyl esters of 3-(3',5'-di-t-butyl-4'-hydroxyphenyl)propionic acid (CAS no. 171090-93-0; 485 g/mol), and
benzenepropanoic acid, 3,5-bis(1,1-dimethyl-ethyl)-4-hydroxy-, C7-C9-branched and linear alkyl esters (CAS no. 125643-61-0; 399 g/mol), The most preferred phenolic antioxidant (A) is pentaerythrityl-tetrakis(3-(3,5-di-tert-butyl-4-hydroxyphenyl)propionate (CAS no. 6683-19-8; 1178 g/mol) having the formula (VI)

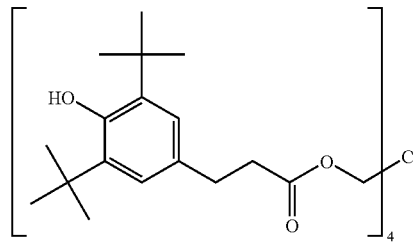

The present polypropylene composition, preferably the present extruded polypropylene composition, can additionally to the phenolic antioxidants (A) comprise one or more phosphorous antioxidant (F). More preferably the polypropylene composition, yet more preferably the extruded polypropylene composition, comprises only one type of phosphorous antioxidant (F). Preferred phosphorous antioxidants (F) are selected from the group consisting of tris-(2,4-di-tert-butylphenyl) phosphite (CAS no. 31570-04-4; 647 g/mol), tetrakis-(2,4-di-tert-butylphenyl)-4,4'-biphenylen-di-phosphonite (CAS no. 38613-77-3; 991 g/mol),
bis-(2,4-di-tert-butylphenyl)-pentaerythrityl-di-phosphite (CAS no. 26741-53-7; 604 g/mol),
di-stearyl-pentaerythrityl-di-phosphite (CAS no. 3806-34-6; M, 733 g/mol),
tris-nonylphenyl phosphite (CAS no. 26523-78-4; 689 g/mol),
bis(2,6-di-tert-butyl-4-methylphenyl)pentaerythrityl-di-phosphite (CAS no. 80693-00-1; 633 g/mol),
2,2'-methylenebis(4,6-di-tert-butylphenyl)octyl-phosphite (CAS no. 126050-54-2; 583 g/mol),
1,1,3-tris(2-methyl-4-ditridecyl phosphite-5-tert-butylphenyl)butane (CAS no. 68958-97-4; 1831 g/mol),
4,4'-butylidenebis(3-methyl-6-tert-butylphenyl-di-tridecyl) phosphite (CAS no. 13003-12-8; 1240 g/mol),
bis-(2,4-dicumylphenyl)pentaerythritol diposphite (CAS no. 154862-43-8; 852 g/mol),
bis(2-methyl-4,6-bis(1,1-dimethylethyl)phenyl)phosphorous acid ethylester (CAS no. 145650-60-8; 514 g/mol), 2,2',2''-nitrilo triethyl-tris(3,3',5,5'-tetra-tert-butyl-1,1'-biphenyl-2,2'-diyl)phosphite) (CAS no. 80410-33-9; 1465 g/mol)

2,4,6-tris(tert-butyl)phenyl-2-butyl-2-ethyl-1,3-propandiol-phosphit (CAS no. 161717-32-4, 450 g/mol), 2,2'-ethyliden-bis(4,6-di-tert-butylphenyl)fluorphosphonit (CAS no. 118337-09-0; 487 g/mol), 6-(3-(3-tert-butyl-4-hydroxy-5-methylphenyl)propoxy)-2,4,8,10-tetra-tert-butyldibenz[d,f][1.3.2]dioxaphosphepin (CAS no. 203255-81-6; 660 g/mol), tetrakis-(2,4-di-tert-butyl-5-methylphenyl)-4,4'-biphenylen-di-phosphite (CAS no. 147192-62-9; 1092 g/mol), and 1,3-bis-(diphenylphosphino)-2,2-dimethylpropane (CAS no. 80326-98-3; 440.5 g/mol).

Especially suitable are organic phosphites, in particular those as defined in the above list, as phosphorous antioxidants (F).

The most preferred phosphorous antioxidant (F) is tris-(2,4-di-tert-butylphenyl)phosphite (CAS no. 31570-04-4; 647 g/mol).

As a further requirement the inventive polypropylene composition, preferably the inventive extruded polypropylene composition, must comprise at least one hindered amine light stabilizer (B). Hindered amine light stabilizers (HALS) are known in the art. Preferably such hindered amine light stabilizers are 2,6-alkyl-piperidine derivatives in particular 2,2,6,6-tetramethyl-piperidine derivatives. Especially suitable are hindered amine light stabilizers (B) of the formula (VII)

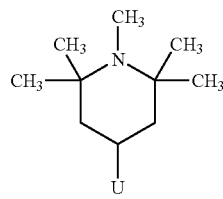

wherein U constitutes the remaining part of the hindered amine light stabilizer (B).

The hindered amine light stabilizers (B) do not absorb UV radiation, but act to inhibit degradation of the polypropylene. They slow down the photochemically initiated degradation reactions, to some extent in a similar way to antioxidants.

The hindered amine light stabilizers (B) show a high efficiency and longevity due to a cyclic process wherein the hindered amine light stabilizers (B) are regenerated rather than consumed during the stabilization process. Accordingly, one advantage of the hindered amine light stabilizers (B) is that significant levels of stabilization are achieved at relatively low concentrations.

Accordingly the hindered amine light stabilizer(s) (B) is(are) preferably selected from the group consisting of bis-(2,2,6,6-tetramethyl-4-piperidyl) sebacate (CAS no. 52829-07-9; 481 g/mol), bis-(1,2,2,6,6-pentamethyl-4-piperidyl) sebacate (CAS no. 41556-26-7; 509 g/mol), tetrakis(2,2,6,6-tetramethyl-4-piperidyl)-1,2,3,4-butane tetracarboxylate (CAS no. 64022-61-3; 792 g/mol), tetrakis(1,2,2,6,6-pentamethyl-4-piperidyl)-1,2,3,4-butane tetracarboxylate (CAS no. 91788-83-9; 847 g/mol), 1,2,3-tris(1,2,2,6,6-pentamethyl-4-piperidyl)-4-tridecyl butane-1,2,3,4-tetracarboxylate (CAS no. 84696-72-0; ca. 900 g/mol), 1,2,3-tris(2,2,6,6-tetramethyl-4-piperidyl)-4-tridecyl butane-1,2,3,4-tetracarboxylate (CAS no. 84696-71-9; ca. 900 g/mol), 2,2,4,4-tetramethyl-7-oxa-3,20-diaza-dispiro(5.1.11.2)-heneicosane-21-on (CAS no. 64338-16-5; 364 g/mol), di-(1,2,2,6,6-pentamethylpiperidin-4-yl)p-methoxybenzylidenemalonate (CAS no. 147783-69-5; 528 g/mol), N,N'-bisformyl-N,N'-bis-(2,2,6,6-tetramethyl-4-piperidinyl)-hexamethylendiamine (CAS no. 124172-53-8; 450 g/mol), dimethyl succinate polymer with 4-hydroxy-2,2,6,6-tetramethyl-1-piperidin ethanol (CAS no. 65447-77-0; $M_w$>2500 g/mol), poly((6-((1,1,3,3-tetramethylbutyl)amino)-1,3,5-triazin-2,4-diyl)-(2,2,6,6-tetramethyl-4-piperidyl)imino)-hexamethylen-((2,2,6,6-tetramethyl-4-piperidyl)imino)) (CAS no. 71878-19-8; $M_w$>2500 g/mol), 1,3,5-triazine-2,4,6-triamine, $N_5N'''$-1,2-ethanediylbis[N-[3-[[4,6-bis[butyl(1,2,2,6,6-pentamethyl-4-piperidinyl) amino]-1,3,5-triazin-2-yl]amino]propyl]-N',N''-dibutyl-N',N''-bis(1,2,2,6,6-pentamethyl-4-piperidinyl)-(CAS no. 106990-43-6; 2286 g/mol), bis-(1-octyloxy-2,2,6,6-tetramethyl-4-piperidinyl) sebacate (CAS no. 129757-67-1; $M_w$ 737 g/mol), 1,6-hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine (CAS no. 192268-64-7; $M_w$ 2600-3400 g/mol), bis(1,2,2,6,6-pentamethyl-4-piperidinyl)-(3,5-bis(1,1-dimethylethyl)-4-hydroxyphenylmethyl)propandioate (CAS no. 63843-89-0; 685 g/mol), 2,9,11,13,15,22,24,26,27,28,-decaazatricyclo (21.3.1.110.14)octacosa-1(27),10,12,14(28),23,25-hexaene-12,25-diamine, N,N'-bis(1,1,3,3-tetramethylbutyl)-2,9,15,22-tetrakis(2,2,6,6-tetramethyl-4-piperidinyl) (CAS no. 86168-95-8; >320 g/mol), poly((6-morpholino-s-triazine-2,4-diyl)(2,2,6,6-tetramethyl-4-piperidyl)imino)hexamethylene(2,2,6,6-tetramethyl-4-piperidyl)imino)) (CAS no 82451-48-7, $M_w$ 1600 g/mol), poly((6-morpholino-s-triazine-2,4-diyl)(2,2,6,6-tetramethyl-4-piperidyl)imino)hexamethylene(1,2,2,6,6-pentamethyi-4-piperidyl)imino)) (CAS no 193098-40-7; $M_w$ ca. 1700 g/mol), polymer of 2,2,4,4-tetxamethyl-7-oxa-3,20-diaza-20-(2,3-epoxi-propyl)-dispiro-(5.1.11.2)-heneicosane-21-one and epichlorohydrin (CAS no. 292483-55-4; $M_w$ ca. 1500 g/mol), 1,3-propanediamine, N,N''-1,2-ethanediylbis-, polymer with 2,4,6-trichloro-1,3,5-triazine, reaction products with N-butyl-2,2,6,6-tetramethyl-4-piperidinamine (CAS no. 136504-96-6; $M_w$ ca. 3000 g/mol), 1,2,3,4-butanetetracarboxylic acid, polymer with beta, beta, beta', beta'-tetramethyl-2,4,8,10-tetraoxospiro(5.5) undecane-3,9-diethanol, 1,2,2,6,6-pentamethyl-4-piperidinyl ester (CAS no. 101357-36-2; $M_w$ ca. 2000 g/mol)

2,4,8,10-tetraoxospiro(5.5) undecane-3,9-diethanol, beta, beta, beta', beta'-tetramethyl-, polymer with 1,2,3,4-butanetetracarboxylic acid, 2,2,6,6-tetramethyl-4-piperidinyl ester (CAS no. 101357-37-3, $M_w$ ca. 1900 g/mol)

polymethylpropyl-3-oxy-4(2,2,6,6-tetramethyl)piperidinyl) siloxane (CAS no 182635-99-0)

N(2,2,6,6-tetramethyl-4-piperidyl)-maleinimid, $C_{20}$: $C_{24}$-olefin-copolymer (CAS no. 152261-33-1; $M_w$ ca. 3500 g/mol), and 4-(3-(3,5-di-t-butyl-4-hydroxyphenyl)propionyloxy)-1-(2-(3-(3,5-di-t-butyl-4-hydroxy)propionyloxy)ethyl)-2,2,6,6-tetramethylpiperidine (CAS no. 73754-27-5; 772 g/mol).

Especially preferred the hindered amine light stabilizer(s) (B) is(are) selected from the group consisting of
bis-(2,2,6,6-tetramethyl-4-piperidyl) sebacate (CAS no. 52829-07-9; 481 g/mol),
bis-(1,2,2,6,6-pentamethyl-4-piperidyl) sebacate (CAS no. 41556-26-7; 509 g/mol),
tetrakis(2,2,6,6-tetramethyl-4-piperidyl)-1,2,3,4-butane tetracarboxylate (CAS no. 64022-61-3; 792 g/mol),
tetrakis(1,2,2,6,6-pentamethyl-4-piperidyl)-1,2,3,4-butane tetracarboxylate (CAS no. 91788-83-9; 847 g/mol),
1,2,3-tris(1,2,2,6,6-pentamethyl-4-piperidyl)-4-tridecyl butane-1,2,3,4-tetracarboxylate (CAS no. 84696-72-0; ca. 900 g/mol),
1,2,3-tris(2,2,6,6-tetramethyl-4-piperidyl)-4-tridecyl butane-1,2,3,4-tetracarboxylate (CAS no. 84696-71-9; ca. 900 g/mol),
N,N'-bisformyl-N,N'-bis-(2,2,6,6-tetramethyl-4-piperidinyl)-hexamethylendiamine (CAS no. 124172-53-8; 450 g/mol),
1,3,5-triazine-2,4,6-triamine, $N_5N'''$-1,2-ethanediylbis[N-[3-[[4,6-bis[butyl(1,2,2,6,6-pentamethyl-4-piperidinyl)amino]-1,3,5-triazin-2-yl]amino]propyl]-N',N''-dibutyl-N',N''-bis(1,2,2,6,6-pentamethyl-4-piperidinyl)-(CAS no. 106990-43-6; 2286 g/mol), and
bis-(1-octyloxy-2,2,6,6-tetramethyl-4-piperidinyl) sebacate (CAS no. 129757-67-1; 737 g/mol).

The most preferred hindered amine light stabilizer(s) (B) is(are) 1,3,5-triazine-2,4,6-triamine, $N_5N'''$-1,2-ethanediyl-bis[N-[3-[[4,6-bis[butyl(1,2,2,6,6-pentamethyl-4-piperidinyl)amino]-1,3,5-triazin-2-yl]amino]propyl]-N',N''-dibutyl-N',N''-bis(1,2,2,6,6-pentamethyl-4-piperidinyl)-(CAS no. 106990-43-6; 2286 g/mol) of formula (VIII)

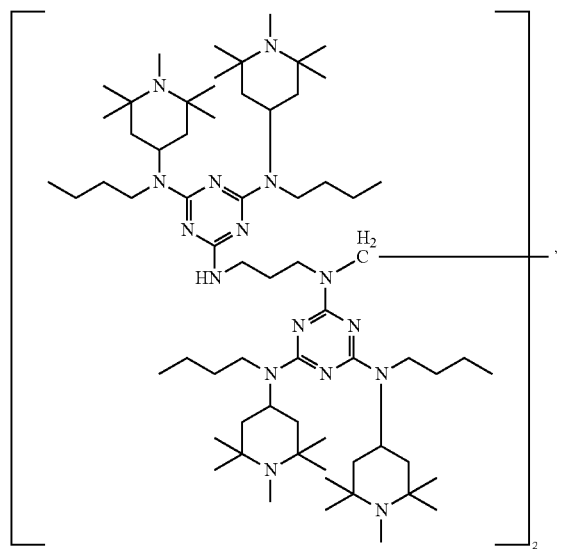

poly((6-((1,1,3,3-tetramethylbutyl)amino)-1,3,5-triazin-2,4-diyl)-(2,2,6,6-tetramethyl-4-piperidyl)imino)-hexamethylen-((2,2,6,6-tetramethyl-4-piperidyl)imino)) (CAS no. 71878-19-8; $M_w$>2500 g/mol), and bis-(2,2,6,6-tetramethyl-4-piperidyl) sebacate (CAS no. 52829-07-9; 481 g/mol) of formula (IX)

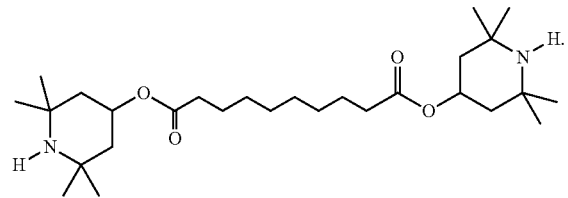

It has been further discovered that especially good results are achievable in case the hindered amine stabilizers (B) have a rather high molecular weight, i.e. a $K_w$ higher than 1000 g/mol, more preferably higher than 2000 g/mol. Accordingly hindered amine stabilizers (B) of the above mentioned list with a $M_w$ higher than 1000 g/mol, more preferably higher than 2000 g/mol are especially preferred. Thus 1,3,5-triazine-2,4,6-triamine, $N_5N'''$-1,2-ethanediylbis[N-[3-[[4,6-bis[butyl(1,2,2,6,6-pentamethyl-4-piperidinyl)amino]-1,3,5-triazin-2-yl]amino]propyl]-N',N''-dibutyl-N',N''-bis(1,2,2,6,6-pentamethyl-4-piperidinyl)-(CAS no. 106990-43-6; 2286 g/mol) of formula (VIII) and poly((6-((1,1,3,3-tetramethylbutyl)amino)-1,3,5-triazin-2,4-diyl)-(2,2,6,6-tetramethyl-4-piperidyl)imino)-hexamethylen-((2,2,6,6-tetramethyl-4-piperidyl)imino)) (CAS no. 71878-19-8; $M_w$>2500 g/mol) are especially suitable as hindered amine light stabilizers (B).

As stated above the inventive polypropylene composition, preferably the inventive extruded polypropylene composition, comprises at least one hindered amine light stabilizer (B) as defined above. Preferably however the present invention comprises one or two different hindered amine light stabilizers (B).

Accordingly in one embodiment, which is in particular preferred, the inventive polypropylene composition, preferably the inventive extruded polypropylene composition, comprises only one hindered amine light stabilizer (B). In such a case it is preferred that the inventive polypropylene composition, preferably the inventive extruded polypropylene composition, comprises a hindered amine light stabilizer (B') with rather high molecular weight, i.e. a $M_w$ higher than 1000 g/mol, more preferably higher than 2000 g/mol. In addition it is preferred that such hindered amine light stabilizer (B') comprises at least four residues, preferably at least 8 residues, of the formula (VII). One preferred example of such a hindered amine light stabilizer (B') is the compound of formula (VIII).

However as stated above the inventive polypropylene composition, preferably the inventive extruded polypropylene composition, may comprises two different hindered amine light stabilizer (B), preferably wherein at least one of the hindered amine light stabilizers (B) is a hindered amine light stabilizer (B') as defined in the previous paragraph. More preferably the inventive polypropylene composition, preferably the inventive extruded polypropylene composition, comprises at least one hindered amine light stabilizer (B') as defined in the previous paragraph and at least one further hindered amine light stabilizer (B''), wherein the hindered amine light stabilizers (B'') has a lower molecular weight than the hindered amine light stabilizer (B'), i.e. a $M_w$ below 1000 g/mol, more preferably below 700 g/mol, yet more preferably below 500 g/mol. Additionally it is appreciated that the hindered amine light stabilizer (B') has a more residues of formula (VII) than the hindered amine light stabilizer (B'').

The hindered amine light stabilizer (B'') is a 2,6 alkyl piperidine derivative in particular a 2,2,6,6-tetramethyl piperidine derivative or a 1,2,2,6,6-pentamethyl piperidine derivative (formula VII). However it is in particular appreciated that the hindered amine light stabilizer (B") is a 2,2,6,6-tetramethyl piperidine derivative, like bis-(2,2,6,6-tetramethyl-4-piperidyl) sebacate (CAS no. 52829-07-9; $M_w$ 481 g/mol) (formula (X))

In case in which the inventive polypropylene composition, preferably the inventive extruded polypropylene composition, comprises two hindered amine light stabilizer (B), i.e. the hindered amine light stabilizers (B') and (B"), the weight ratio of the hindered amine light stabilizer (B') to the hindered amine light stabilizer (B") [B'/B"] is at least 2.0:1.0, more preferably at least 2.5:1.0, yet more preferably 2.6:1.0.

In any case the amount of the hindered amine light stabilizer (B") within the inventive extruded composition shall not exceed 500 ppm, more preferably shall not exceed 300 ppm. It is in particular preferred, as stated above, that the inventive polypropylene composition, preferably the inventive extruded polypropylene composition, comprises as hindered amine light stabilizer (B) only the hindered amine light stabilizer (B').

As further requirement the inventive polypropylene composition, preferably the inventive extruded polypropylene composition, must comprise at least one slip agent (C) being a fatty acid amide. More preferably the inventive polypropylene composition, preferably the inventive extruded polypropylene composition, comprises only one slip agent (C). Preferred types of slip agents (C) are unsaturated fatty acid amides. The amount of carbons of the fatty acids is preferably in the range of C10 to C25 carbon atoms.

Accordingly the slip agent(s) (C) is(are) preferably selected from the group consisting of
cis-13-docosenoic amide (CAS no. 112-84-5; $M_w$ 337.6 g/mol),
cis-9,10 octadecenoamide (CAS no. 301-02-0; $M_w$ 281.5 g/mol)
octadecanoylamide (CAS no. 124-26-5; $M_w$ 283.5 g/mol),
behenamide (CAS no. 3061-75-4; $M_w$ 339.5 g/mol),
N,N'-ethylene-bis-stearamide (CAS no. 110-30-5; $M_w$ 588 g/mol),
N-octadecyl-13-docosenamide (CAS no. 10094-45-8; $M_w$ 590 g/mol), and
oleylpalmitamide (CAS no. 16260-09-6; M, 503 g/mol)

Especially suitable is(are) cis-13-docosenoic amide (CAS no. 112-84-5; M, 337.6 g/mol) and/or cis-9,10 octadecenoamide (CAS no. 301-02-0; M, 281.5 g/mol).

A further essential requirement of the present invention is the use of a specific epoxy resin (D). The specific selection of the epoxy resin (D) enables to reduce the amount of antioxidants and to some extent also the hindered amine light stabilizers and therewith the amount of the main causers in the (extruded) polypropylene composition of the stickiness problems at elevated temperatures and/or UV-exposure. Accordingly the inventive polypropylene composition, preferably the inventive extruded polypropylene composition, comprises a bisphenol A epoxy resin being a condensation product of 2,2-bis(p-glycidyloxyphenyl) propane with 2,2-bis(p-hydroxyphenyl)propane. Preferably such a bisphenol A epoxy resin has an average molecular weight ($M_w$) below 2000 g/mol (D). More preferably the epoxy resin (D) has an average molecular weight ($M_w$) in the range of 1100 to 2000 g/mol. The most preferred bisphenol A epoxy resin is that one with the CAS no. 25036-25-3 ($M_w$ 1100 to 1500 g/mol). In a preferred embodiment the inventive polypropylene composition, preferably the inventive extruded polypropylene composition, comprises only the bisphenol A epoxy resin (D) as defined in this paragraph but no other types of epoxy resins.

In addition to the above mentioned components the inventive polypropylene composition, preferably the inventive extruded polypropylene composition, must comprise talc (E). Talc (E) is a mineral composed of hydrated magnesium silicate.

Preferably the talc (E) according to this invention has a particle size (d50%) of below 3.0 μm (d50% indicates that 50 wt-% of the talc has a particle size below 3.0 μm) and/or a particle size (d98%) of below 15.0 μm (d98% indicates that 98 wt-% of the talc has a particle size below 15.0 μm), more preferably a particle size (d50%) of below 2.0 μm and/or a particle size (d98%) of below 10.0 μm, yet more preferably more preferably a particle size (d50%) of below 1.0 μm and/or a particle size (d98%) of below 5.0 μm.

To obtain especially good results the components of the inventive polypropylene composition, preferably the inventive extruded polypropylene composition, should be present in specific amounts.

For instance it is preferred that the weight ratio of the bisphenol A epoxy resin (D) to the talc (E) is 1.0:60, more preferably 1.0:64.

Additionally the inventive polypropylene composition, preferably the inventive extruded polypropylene composition, can comprise 50000 to 400000 ppm, preferably 100000 to 300000 ppm, yet more preferably of 140000 to 200000 ppm, of talc (E).

Accordingly it is appreciated that the inventive polypropylene composition, preferably the inventive extruded polypropylene composition, comprises (a) 400 to 2400 ppm, more preferably 800 to 2100 ppm, of phenolic antioxidant(s) (A), preferably pentaerythrityl-tetrakis(3-(3,5-di-tert-butyl-4-hydroxyphenyl)propionate (CAS no. 6683-19-8; $M_w$ 1178 g/mol), (b) 800 to 2500 ppm, more preferably 900 to 2000 ppm, yet more preferably 1200 to 1600 ppm, of hindered amine light stabilizer(s) (B') with $M_w$ higher than 1000 g/mol, more preferably higher than 2000 g/mol, like 1,3,5-triazine-2,4,6-triamine, $N_5N'''$-1,2-ethanediylbis[N-[3-[[4,6-bis[butyl(1,2,2,6,6-pentamethyl-4-piperidinyl)amino]-1,3,5-triazin-2-yl]amino]propyl]-N',N"-dibutyl-N',N"-bis(1,2,2,6,6-pentamethyl-4-piperidinyl)-(CAS no. 106990-43-6; $M_w$ 2286 g/mol) of formula (VIII) and/or poly((6-((1,1,3,3-tetramethylbutyl)amino)-1,3,5-triazin-2,4-diyl)-(2,2,6,6-tetramethyl-4-piperidyl)imino)-hexamethylen-((2,2,6,6-tetramethyl-4-piperidyl)imino)) (CAS no. 71878-19-8; $M_w$>2500 g/mol), (c) optional below 500 ppm, more preferably free of, hindered amine light stabilizers (B") with a $M_w$ below 1000 g/mol, more preferably below 700 g/mol, yet more preferably below 500 g/mol, like bis-(2,2,6,6-tetramethyl-4-piperidyl)sebacate (CAS no. 52829-07-9; $M_w$ 481 g/mol), (d) 1000 to 2000 ppm, more preferably 1200 to 1600 ppm, of slip agent (C) being a fatty acid amide, preferably cis-13-docosenoic amide (CAS no. 112-84-5; $M_w$ 337.6 g/mol) and/or cis-9,10 Octadecenoamide (CAS no. 301-02-0; $M_w$ 281.5 g/mol), more preferably cis-9,10 Octadecenoamide (CAS no. 301-02-0; $M_w$ 281.5 g/mol), (e) 2000 to 3000 ppm, more preferably 2200 to 2600 ppm, of bisphenol A epoxy resin with an average molecular weight ($M_w$) below 2000 g/mol (D), preferably bisphenol A epoxy resin with the CAS no. 25036-25-3 ($M_w$ 1100 to 1500 g/mol), (f) 50000 to 400000 ppm, preferably 100000 to 300000 ppm, yet more preferably of 140000 to 200000 ppm, of talc (E), and (g) optionally 500 to 1500 ppm, more preferably 800 to 1100 ppm, of phosphorous antioxidant(s) (F), preferably tris-(2,4-di-tert-butylphenyl)phosphite (CAS no. 31570-04-4; $M_w$ 647 g/mol), based on said (extruded) polypropylene composition.

In a preferred embodiment the inventive polypropylene composition, preferably the inventive extruded polypropylene composition, as defined in the previous paragraph does not comprise, i.e. is free of, polyorganosiloxane. Yet more preferably the inventive polypropylene composition, preferably the inventive extruded polypropylene composition, as defined in the previous paragraph does not comprise, i.e. is free of, polyorganosiloxane, distearylthiodipropionate and zinc stearate.

The polypropylene used in the inventive polypropylene composition, preferably the inventive extruded polypropylene composition, can be any polypropylene, in particular polypropylenes suitable for the automotive interior. Accordingly a preferred polypropylene is a heterophasic propylene copolymer. Heterophasic polypropylene systems are well known in the art and are systems in particular obtained in an at least two step process resulting in a multiphase structure comprising a propylene matrix and inclusions therein comprising amorphous elastomer. Such systems can be easily tailored for the automotive requirements by setting the comonomer content in the matrix and in the elastomeric phase respectively. Such a heterophasic propylene copolymer may have an $MFR_2$ in the range of 8.0 to 20.0 g/10 min, more preferably in the range of 9.0 to 15.0 g/10 min. Typically such a heterophasic propylene copolymer has a rubber phase being a propylene-ethylene rubber (EPR). The total comonomer, preferably ethylene, content is in the range of 10 to 30 wt.-% based on the total heterophasic propylene copolymer. The amount of xylene solubles may be in the range of 20 to 35 wt.-%, preferably 25 to 30 wt.-%.

In addition to the heterophasic propylene copolymer the polypropylene according to this invention may comprise further polymer components like a (isotactic) propylene homopolymer, preferably with an $MFR_2$ (230° C.) in the range of 10.0 to 30.0 g/10 min, more preferably in the range of 15.0 to 25.0 g/10 min, and/or a high density polyethylene (HDPE), preferably a high density polyethylene (HDPE) with a density of 0.962 to 0.966 g/cm$^3$, like 0.964 g/cm$^3$. The high density polyethylene (HDPE) may have an $MFR_2$ (190° C.) of 7.0 to 12 g/10 min, more preferably of 7.5 to 8.5 g/10 min, like 8 g/10 min.

Preferably the polypropylene according to this invention is a mixture of a heterophasic propylene copolymer and a high density polyethylene (HDPE). Optionally also an (isotactic) propylene homopolymer is present.

Preferably the polypropylene is present in the inventive polypropylene composition, preferably the inventive extruded polypropylene composition, in the amount of at least 60.0 wt.-%, more preferably at least 70.0 wt.-%, yet more preferably at least 75.0 wt.-%, still more preferably of at least 80.0 wt.-%.

In case the polypropylene is a polymer mixture in which at least one polymer component is a heterophasic propylene copolymer, like one as defined above, it is preferred that the inventive polypropylene composition, more preferably the extruded composition, comprises at least 55.0 wt.-%, more preferably at least 60.0 wt.-%, of said heterophasic propylene copolymer. Additionally said mixture may comprise up to 15.0 wt.-%, like 11.5 to 12.5 wt.-% of an (isotactic) propylene homopolymer and/or up to 13.0 wt.-%, like 9.5 to 10.5 wt.-%, of a high density polyethylene (HDPE).

Of course the present invention may comprise further additives like pigments, for instance in the form of a master batch. However it shall preferably not contain such additives which are explicitly excluded by this invention.

The inventive polypropylene composition, preferably the inventive extruded polypropylene composition, is preferably obtained by mixing the polymer and the additives as mentioned in the instant invention to form a blend and extruding the blend, preferably with a twin-screw extruder is used, like the twin-screw extruder ZSK40, to form preferably a strand. Even more preferred the (extruded) composition is pelletelized, preferably by pelletizing the extruded strand using well-known conventional techniques and apparatus. Accordingly the present invention is in particular directed to pellets of the extruded polypropylene composition according to this invention.

The present invention is additionally directed to the use of a bisphenol A epoxy resin with an average molecular weight ($M_w$) below 2000 g/mol (D) for the regulation of stickiness, in particular to reduce the stickiness, of (extruded) compositions comprising
(a) polypropylene,
(b) at least one, preferably one, phenolic antioxidant (A),
(c) at least one hindered amine light stabilizer (B),
(d) optionally at least one, preferably one, slip agent (C) being a fatty acid amide,
(e) talc (E), and
(f) optionally at least one phosphorous antioxidant (F).

The term "reducing stickiness" throughout the present invention shall indicate that (extruded) compositions (or articles) comprising the bisphenol A epoxy resin (D) have reduced stickiness (as defined in the example section) compared to (extruded) compositions (or articles) comprising the same components but no bisphenol A epoxy resin (D).

Concerning the preferred embodiments of the bisphenol A epoxy resin (D), the polypropylene, the phenolic antioxidant (A), the hindered amine light stabilizer (B), the slip agent (C), the talc (E) and the phosphorous antioxidant (F) it is referred to the definitions made above. Thus amounts of additives to be used in the (extruded) composition are the same as defined above. This applies in particular to the used amounts of the bisphenol A epoxy resin (D) to regulate, in particular to reduce, the stickiness of (extruded) compositions. It is especially preferred that the bisphenol A epoxy resin (D) as defined in the instant invention is used for (extruded) composition as defined herein, in particular to those compositions being free of polyorganosiloxane, distearylthiodipropionate and zinc stearate.

The present invention has in particular discovered that surprisingly the phenolic antioxidants (A) and the hindered amine light stabilizers (B) in an (extruded) polypropylene composition comprising additionally talc (E) and optionally a slip agent (C) being a fatty acid amide contribute to the stickiness problems at elevated temperatures and/or UV-exposure. The present invention has further discovered that bisphenol A epoxy resin (D) can partially replace the phenolic antioxidants (A) and the hindered amine light stabilizers (B) without compromising other important properties like scratch resistance and long term heat resistance and on the other hand such a replacement significantly contributes to the reduction of stickiness. Accordingly the present invention is preferably directed to the use of a bisphenol A epoxy resin with an average molecular weight ($M_w$) below 2000 g/mol (D) for the regulation of stickiness, in particular to reduce the stickiness, of (extruded) compositions comprising
(a) polypropylene,
(b) at least one, preferably one, phenolic antioxidant (A),
(c) at least one hindered amine light stabilizer (B), (d) optionally at least one, preferably one, slip agent (C) being a fatty acid amide, (e) talc (E), and (f) optionally at least one phosphorous antioxidant (F), by partially replacing the phenolic antioxidant (A) and/or the hindered amine light stabilizer (B) by the bisphenol A epoxy resin (D). "Partially replacing" means that the amount of phenolic antioxidant (A) and/or the hindered amine light stabilizer (B) can be lowered in an (extruded) composition in which bisphenol A epoxy resin (D) is present compared to a composition containing no bisphenol A epoxy resin (D).

Accordingly in a specific preferred embodiment the present invention is directed to the use of a bisphenol A epoxy resin with an average molecular weight ($M_w$) below 2000 g/mol (D) for the regulation of stickiness, in particular to reduce the stickiness, of (extruded) compositions comprising (a) polypropylene, (b) at least one, preferably one, phenolic antioxidant (A), (c) at least one hindered amine light stabilizer (B), (d) optionally at least one, preferably one, slip agent (C) being a fatty acid amide, (e) talc (E), and (f) optionally at least one phosphorous antioxidant (F), by partially replacing the phenolic antioxidant (A) and/or the hindered amine light stabilizer (B) by the bisphenol A epoxy resin (D). "Partially replacing" means that the amount of phenolic antioxidant (A) and/or the hindered amine light stabilizer (B) can be lowered in an (extruded) composition in which bisphenol A epoxy resin (D) is present compared to a composition containing no bisphenol A epoxy resin (D). Accordingly by using bisphenol A epoxy resin (D) the amount of phenolic antioxidant (A) and/or the hindered amine light stabilizer (B) is lowered by at least 30 wt.-%, more preferably by at least 40 wt.-%, in the (extruded) composition compared to an composition comprising the same components but no bisphenol A epoxy resin (D).

It is in particular appreciated that the use of the bisphenol A epoxy resin (D) regulates the stickiness, in particular to reduce the stickiness, of (extruded) compositions by keeping the long term heat resistance constant, wherein the (extruded) compositions comprise (a) polypropylene, (b) at least one, preferably one, phenolic antioxidant (A), (c) at least one hindered amine light stabilizer (B), (d) optionally at least one, preferably one, slip agent (C) being a fatty acid amide, (e) talc (E), and (f) optionally at least one phosphorous antioxidant (F).

The present invention is additionally directed to the use of the inventive (extruded) polypropylene composition, in particular to the use of pellets of the inventive (extruded) polypropylene composition, to regulate the stickiness, preferably to reduce the stickiness, of articles, in particular of moulded articles, made out of it. A preferred use of the inventive (extruded) polypropylene composition, i.e. of the pellets of the inventive (extruded) polypropylene composition, is to regulate the stickiness, preferably to reduce the stickiness, of covering elements, like covering elements for vehicles.

Furthermore the present invention is directed to automotive articles, preferably automotive interior articles, like dashboards, door claddings, armrests or other interior trims, comprising the (extruded) polypropylene composition as defined herein.

The present invention is further described by way of examples.

EXAMPLES

1. The following definitions of terms and determination of methods apply for the above general description of the invention as well as to the below examples unless otherwise defined.

Mw, Mn, MWD

Mw/Mn/MWD are measured by Gel Permeation Chromatography (GPC) according to the following method:

The weight average molecular weight (Mw) and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter is used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution are injected per analysis. The column set is calibrated using relative calibration with 19 narrow MWD polystyrene (PS) standards in the range of 0.5 kg/mol to 11 500 kg/mol and a set of well characterized broad polypropylene standards. All samples are prepared by dissolving 5 to 10 mg of polymer in 10 mL (at 160° C.) of stabilized TCB (same as mobile phase) and keeping for 3 hours with continuous shaking prior sampling in into the GPC instrument.

$MFR_2$ (230° C.) is measured according to ISO 1133 (230° C., 2.16 kg load).

$MFR_2$ (190° C.) is measured according to ISO 1133 (190° C., 2.16 kg load).

Ethylene content, in particular of the matrix, i.e. polypropylene (A), is measured with Fourier transform infrared spectroscopy (FTIR) calibrated with $^{13}$C-NMR. When measuring the ethylene content in polypropylene, a thin film of the sample (thickness about 250 µm was prepared by hot-pressing. The area of absorption peaks 720 and 733 cm$^{-1}$ was measured with Perkin Elmer FTIR 1600 spectrometer. The method was calibrated by ethylene content data measured by $^{13}$C-NMR.

The xylene solubles (XS, wt.-%): Content of Xylene solubles (XS) is determined at 23° C. according ISO 6427.

Stickiness Performance:

This testing method is being used to measure and define the surface stickiness of materials being used in automotive interior grades.

Test Method:

Three plaques (not smaller than 100×50×4 mm, smooth surface on at least one side) or cut plaques from final parts shall be stored under specific conditions and afterwards undergo finger-testing as explained below (see Table 2).

Testing conditions may be either oven testing at 90° C. for a period of 90 h and 500 h respectively or alternatively artificial weathering (UV testing) at conditions as described in table 1.

TABLE 1

| Test conditions artificial weathering | |
|---|---|
| black-panel-temperature | 100 +/− 3° C. |
| chamber temperature | 65 +/− 3° C. |
| rel. humidity | 20 +/− 10% |
| radiation intensity | 60 W/m$^2$ |
| filter system | 3 UV-Special Suprax |
| period of storage | 5 × 72 h |

As an apparatus XENO 1200 CPS (Co. HERAEUS) is used.

Finger tests (gentle pushing and lifting) shall be made on the warm parts (smooth surface) one minute after removal from oven. The tester's hands shall be dry and clean. After touching a sticky specimen the tester must wash hands to not influence the following tests. The test shall be carried out by 3 persons on 3 different plaques. The impression of finger testing shall be classified on the following stickiness index (see Table 2). The final stickiness index shall be calculated from the average of all three testers.

TABLE 2

Stickiness Index:

| | |
|---|---|
| 1 | Not sticky |
| 2 | Almost not sticky |
| 3 | Minor stickiness, not disturbing |
| 4 | Sticky (plate does not stick on finger when being lifted) |
| 5 | Very sticky (plate sticks on finger when being lifted) |

UV-Stability

UV Stability was measured using the testing device XENO 1200 CPS (Co. HERAEUS).

For this method a minimum of 3 specimens not smaller than 60×60×3 mm were put into an apparatus as specified below. The specimens may be injection moulded according ISO/DIS 1873-2 or alternatively be cut from part. Specimens shall be tested according conditions as listed below (table 3).

For evaluating the specimens after UV exposure, the grey scale (according DIN EN 20 105-A02) shall be measured. To pass the test, greyscale values not smaller than 4 must be measured.

Apparatus: XENO 1200 CPS (Co. HERAEUS)

TABLE 3

Test conditions artificial weathering

| | |
|---|---|
| black-panel-temperature | 90 +/− 2° C. |
| chamber temperature | 50 +/− 2° C. |
| rel. humidity | 20 +/− 10% |
| radiation intensity | 75 W/m$^2$ |
| filter system | 3 UV-Special Suprax |
| period of storage | 1500 h |

Long Term Heat Resistance

For this method a minimum of 3 specimens with size of 60×60×3 mm were put into a forced draught oven (dauerumluft ofen) (Co. HERAEUS) at a temperature of 150° C. (+/− 1). The specimens may be injection moulded according ISO/DIS 1873-2 or alternatively be cut from part.

Specimens must withstand at least 400 h of heat exposure without showing the for PP typical degradation appearance.

Scratch Resistance

To determine the scratch resistance a Cross Hatch Cutter Model 42Op, manufactured by Erichsen, was used.

For the tests, plaques of 70×70×4 mm size were cut from a moulded grained (grain parameters: average grain size=1 mm, grain depth=0.12 mm, conicity=6°) plaque of size 140× 200×4 mm. The minimum period between injection moulding of specimens and scratch-testing was 7 days For testing the specimens must be clamped in a suitable apparatus as described above. Scratches are applied at a force of 10 N using a cylindrical metal pen with a ball shaped end (radius=0.5 mm+−0.01). A cutting speed of 1000 mm/min is used.

A minimum of 20 scratches parallel to each other are brought up at a load of 10 N with a distance of 2 mm. The application of the scratches is repeated perpendicular to each other, so that the result is a scratching screen. The scratching direction shall be unidirectional.

The scratch resistance is reported as the difference of the luminance ΔL of the unscratched from the scratched areas. ΔL values can be measured using a spectrophotometer that fulfils the requirements to DIN 5033.

Measured ΔL Values must be below a maximum of 1.5.

A detailed test description of the test method can be found in the article "Evaluation of scratch resistance in multiphase PP blends" by Thomas Koch and Doris Machl, published in POLYMER TESTING 26 (2007), p. 927-936.

2. Preparation of Examples

The components are injection moulded using the machines ES 1050/250 HL (Co. ENGEL). The melt temperature is 240° C., tool temperature 30° C.; injection time 2 s, cycle time 1 min, dwell pressure time 20 s at 50 bar, cooling time 25 s.

The propylene copolymer is a heterophasic propylene copolymer having an MFR (230° C./2.16 kg) of 11.5 g/10 min and a total ethylene content of 16.0 wt.-%. The xylene solubles are in the range of 27.5 to 30.5 wt.-%.

The propylene homopolymer is the commercial product HF 955 MO of Borealis (MFR (230° C./2.16 kg) 20 g/10 min; density 920 kg/m$^3$).

The HDPE is the commercial product MG 9641 of Borealis (MFR (190° C./2.16 kg) 8 g/10 min; density 964 kg/m$^3$).

TABLE 4

Properties of the examples

| | | CEX 1 | CEX 2 | IEX 3 | IEX 4 | CEX 5 | CEX 6 |
|---|---|---|---|---|---|---|---|
| PP Copolym. | [wt.-%] | ca. 58[1] | ca. 58[1] | ca. 58[1] | ca. 58[1] | ca. 58[1] | ca. 58[1] |
| PP Homopol. | [wt.-%] | 12.0 | 12.0 | 12.0 | 12.0 | 12.0 | 12.0 |
| HDPE | [wt.-%] | 10.0 | 10.0 | 10.0 | 10.0 | 10.0 | 10.0 |
| talc | [wt.-%] | 15.0 | 15.0 | 15.0 | 15.0 | 15 | 15.0 |
| AO 106 | [ppm] | 2500 | 0 | 0 | 0 | 0 | 0 |
| AO 101 | [ppm] | 600 | 3500 | 2000 | 500 | 2000 | 500 |
| AO 200 | [ppm] | 1500 | 2000 | 1000 | 1000 | 1000 | 1000 |
| OT 700 | [ppm] | 0 | 0 | 2500 | 2500 | 0 | 0 |
| UV 200 | [ppm] | 1000 | 1000 | 500 | 0 | 500 | 0 |
| UV 222 | [ppm] | 900 | 900 | 1500 | 1500 | 1500 | 1500 |
| SA 110 | [ppm] | 1500 | 1500 | 1500 | 1500 | 1500 | 1500 |
| CMB | [wt.-%] | 4.0 | 4.0 | 4.0 | 4.0 | 4.0 | 4.0 |

TABLE 4-continued

Properties of the examples

| | | CEX 1 | CEX 2 | IEX 3 | IEX 4 | CEX 5 | CEX 6 |
|---|---|---|---|---|---|---|---|
| Stickiness | [1-6]* | 5.0 | 4.5 | 2.5 | 2.0 | 2.5 | 2.0 |
| UV-stability | Grey scale*** | 4 | 4.5 | 5 | 4.5 | 4.5 | 4 |
| Long term heat resistance | [h]**** | >400 | >400 | >400 | >400 | <400 | <400 |
| Scratch resistance | ΔL** | 1.15 | 0.82 | 1.04 | 0.95 | 0.57 | 0.73 |

[1]"ca. 58" indicates that the propylene copolymer constitutes the rest of the composition up to 100 wt.-%.
*Stickiness Index: see table 1
**ΔL describes the change of the color impression at the scratched place of the sample (ΔL = 0 indicates no change of color; values below ΔL ≤ 1.5 are required by the automotive industry)
***Gray scale according to DIN EN 20105-A02.
****required is >400 h
AO 106: 1,3,5-tris (3',5'-di-tert-butyl-4'-hydroxybenzyl)-isocyanurate (CAS no. 27676-62-6; 784 g/mol)
AO 101: pentaerythrityl-tetrakis (3-(3,5-di-tert-butyl-4-hydroxyphenyl)propionate (CAS no. 6683-19-8; 1178 g/mol)
AO 200: tris-(2,4-di-tert-butylphenyl) phosphite (CAS no. 31570-04-4; 647 g/mol)
OT 700: bisphenol A epoxy resin with the CAS no. 25036-25-3 ($M_w$ 1100 to 1500 g/mol)
UV 200: bis-(2,2,6,6-tetramethyl-4-piperidyl) sebacate (CAS no. 52829-07-9; 481 g/mol)
UV 222: 1,3,5-triazine-2,4,6-triamine, $N_5N'''$-1,2-ethanediylbis[N-[3-[[4,6-bis[butyl(1,2,2,6,6-pentamethyl-4-piperidinyl)amino]-1,3,5-triazin-2-yl]amino]propyl]-N',N"-dibutyl-N',N"-bis(1,2,2,6,6-pentamethyl-4-piperidinyl)-(CAS no. 106990-43-6; 2286 g/mol)
SA 110: cis-9,10 Octadecenoamide (CAS no. 301-02-0; 281.5 g/mol)
CMB: colour master batch (40 wt.-% pigments, 40 wt.-% polyethylene, 20 wt.-% polypropylene)

We claim:

1. Composition comprising polypropylene and
   (a) 400 to 2400 ppm of phenolic antioxidant(s) (A)
   (b) 1000 to 2500 ppm of hindered amine light stabilizer (B)
   (c) 1000 to 2000 ppm of slip agent(s) (C) being a fatty acid amide,
   (d) 2000 to 3000 ppm of a bisphenol A epoxy resin with an average molecular weight ($M_w$) below 2000 g/mol (D),
   (e) 50000 to 400000 ppm of talc (E), and,
   (f) 500 to 1500 ppm of optionally at least one phosphorous antioxidant (F) based on said composition,
   wherein the hindered amine light stabilizer (B) contains at least eight moieties of 1,2,2,6,6-pentamethyl-4-piperidinyl, has a molecular weight higher than 2000 g/mol, and is the only hindered amine stabilizer which is present in the composition.

2. Composition according to claim 1, wherein the composition is an extruded composition.

3. Composition according to claim 1, wherein said composition does not comprise polyorganosiloxane.

4. Composition according to claim 1, wherein said composition does not comprise distearylthiodipropionate and/or zinc stearate.

5. Composition according to claim 1, wherein weight ratio of the bisphenol A epoxy resin (D) to the talc (E) is 1.0:60.

6. Composition according to claim 1, wherein the composition comprises only one phenolic antioxidant (A).

7. Composition according to claim 1, wherein the phenolic antioxidant(s) (A) is (are) sterically hindered.

8. Composition according to claim 1, wherein the phenolic antioxidant(s) (A) comprise(s) the residue of formula (I)

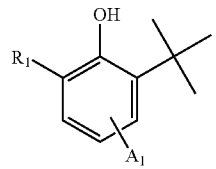

(I)

wherein $R_1$ is $(CH_3)_3C-$, $CH_3-$ or H, and $A_1$ constitutes the remaining part of the phenolic antioxidant (A).

9. Composition according to claim 8, wherein the phenolic antioxidant(s) (A) has(have) a molecular weight ($M_w$) of more than 785 g/mol.

10. Composition according to claim 9, wherein the phenolic antioxidant(s) (A) comprise(s) 1, 2, 4 or more phenolic residue(s).

11. Composition according to claim 9, wherein the phenolic antioxidant(s) (A) does(do) not comprise the moiety of formula (III)

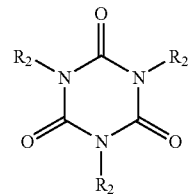

wherein $R_2$ is selected from the group consisting of $-CH_2-R_{31}$, $-CH_2-CH_2-R_{32}$, $-CH_2-CH_2-CH_2-R_{33}$ and $-CH_2-CH_2-CH_2-CH_2-R_{34}$, and $R_{31}$, $R_{32}$, $R_{33}$ and $R_{34}$ can be independently any organic residue with the proviso that at least one of the $R_{31}$, $R_{32}$, $R_{33}$ and $R_{34}$ is a phenolic moiety.

12. Composition according to claim 1, wherein the phenolic antioxidant(s) (A) comprise(s) at least one residue of formula (II)

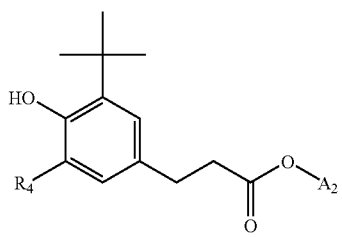

wherein
R₄ is (CH₃)₃C—, CH₃—, or H, and
A₂ constitutes the remaining part of the phenolic antioxidant (A).

13. Composition according to claim 1, wherein the phenolic antioxidant (A) is of formula (VI)

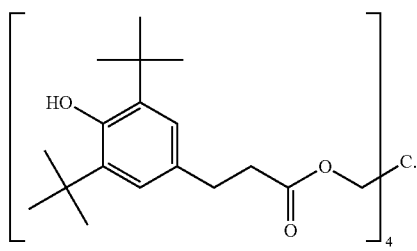

14. Composition according to claim 1, wherein the composition is free of phenolic antioxidants (A) comprising the moiety of formula (IV)

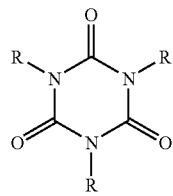

wherein R is any residue which may comprise a phenolic moiety.

15. Composition according to claim 1, wherein said composition is free of the phenolic antioxidant (A) of formula (V)

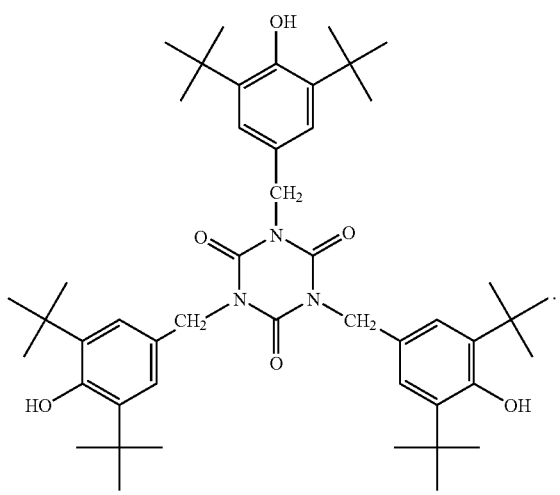 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

16. Composition according to claim 1, wherein at least one slip agent (C) is(are) an unsaturated fatty acid amide(s).

17. Composition according to claim 1, wherein the slip agent(s) (C) being (a) fatty acid amide(s) comprise(s) C10 to C25 carbon atoms.

18. Composition according to claim 1, wherein the composition comprises only one slip agent (C).

19. Composition according to claim 1, wherein the slip agent (C) is cis-13-docosenoic amide (CAS no. 112-84-5; $M_w$ 337.6 g/mol) and/or cis-9,10 octadecenoamide.

20. Composition according to claim 1, wherein the bisphenol A epoxy resin (D) has an average molecular weight ($M_w$) in the range of 1100 to 2000 g/mol.

21. Composition according to claim 1, wherein the bisphenol A epoxy resin (D) is condensation product of 2,2-bis(p-glycidyloxyphenyl)propane with 2,2-bis(p-hydroxyphenyl)propane.

22. Composition according to claim 1, wherein the bisphenol A epoxy resin (D) has the CAS-number 25036-25-3.

23. Composition according claim 1, wherein weight ratio of the bisphenol A epoxy resin (D) to the talc (E) is 1.0:64.

24. Composition according to claim 1, wherein the hindered amine light stabilizer (B) is defined by formula (VIII)

(VIII)

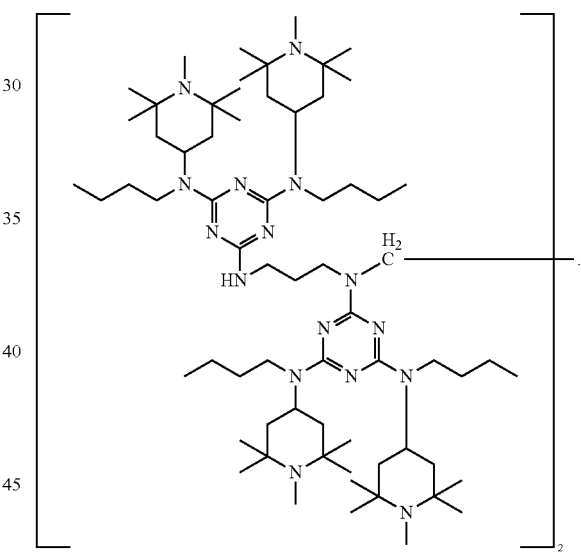

25. Automotive article comprising a composition comprising polypropylene and
(a) 400 to 2400 ppm of phenolic antioxidant(s) (A)
(b) 1000 to 2500 ppm of hindered amine light stabilizer (B)
(c) 1000 to 2000 ppm of slip agent(s) (C) being a fatty acid amide,
(d) 2000 to 3000 ppm of a bisphenol A epoxy resin with an average molecular weight ($M_w$) below 2000 g/mol (D),
(e) 50000 to 400000 ppm of talc (E), and,
(f) 500 to 1500 ppm of optionally at least one phosphorous antioxidant (F) based on said composition,
wherein the hindered amine light stabilizer (B) contains at least eight moieties of 1,2,2,6,6-pentamethyl-4-piperidinyl, has a molecular weight higher than 2000 g/mol, and is the only hindered amine stabilizer which is present in the composition.

26. Process for using a bisphenol A epoxy with an average molecular weight ($M_w$) below 2000 g/mol (D) for the regulation of stickiness of an extruded composition, said process comprising:
- (1) compounding a composition comprising polypropylene and
  - (a) 400 to 2400 ppm of phenolic antioxidant(s) (A)
  - (b) 1000 to 2500 ppm of hindered amine light stabilizer (B)
  - (c) 1000 to 2000 ppm of slip agent(s) (C) being a fatty acid amide,
  - (d) 2000 to 3000 ppm of said bisphenol A epoxy resin with an average molecular weight ($M_w$) below 2000 g/mol (D),
  - (e) 50000 to 400000 ppm of talc (E), and
  - (f) 500 to 1500 ppm of optionally at least one phosphorous antioxidant (F) based on said composition; wherein the hindered amine light stabilizer (B) contains at least eight moieties of 1,2,2,6,6-pentamethyl-4-piperidinyl, has a molecular weight higher than 2000 g/mol, and is the only hindered amine stabilizer which is present in the composition; and (2) extruding an article from said composition.

27. The process according to claim 26, wherein the bisphenol A epoxy resin with an average molecular weight ($M_w$) below 2000 g/mol (D) regulates the stickiness by keeping long term heat resistance constant.

28. The process according to claim 26, wherein the article is a covering element of a vehicle.

\* \* \* \* \*

UNITED STATES PATENT AND TRADEMARK OFFICE
CERTIFICATE OF CORRECTION

| | |
|---|---|
| PATENT NO. | : 8,721,946 B2 |
| APPLICATION NO. | : 12/735460 |
| DATED | : May 13, 2014 |
| INVENTOR(S) | : Klaus Lederer and Erwin Kastner |

Page 1 of 1

It is certified that error appears in the above-identified patent and that said Letters Patent is hereby corrected as shown below:

In the Specification

Column 3, Line 66, "exits" should be --exists--

Column 5, Line 57, "M," should be --$M_w$--

Column 5, Line 58, "K" should be --$M_w$--

Column 5, Line 60, "K" should be --$M_w$--

Column 6, Line 52, "M," should be --$M_w$--

Column 10, Line 13, "K" should be --$M_w$--

Column 10, Line 43, add --more preferably 16 residues-- after "8 residues"

Column 10, Line 49, "comprises" should be --comprised--

Column 10, Line 62, delete "a"

Column 11, Line 41, "M" should be --$M_w$--

Column 11, Line 43, "M" should be --$M_w$--

Column 11, Line 44, "M" should be --$M_w$--

Column 12, Line 11, delete "more preferably"

Column 18, Line 5, delete "for"

Signed and Sealed this
Twenty-first Day of April, 2015

Michelle K. Lee
*Director of the United States Patent and Trademark Office*